Aug. 1, 1967  H. GOLDE  3,333,889
AUTOMOTIVE VEHICLE
Filed March 16, 1965  3 Sheets-Sheet 1
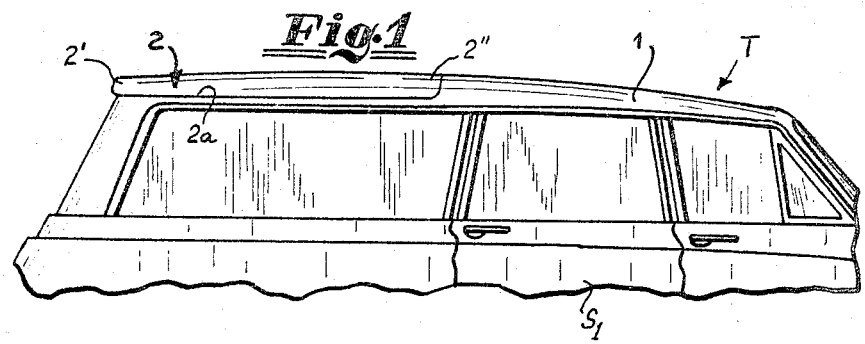
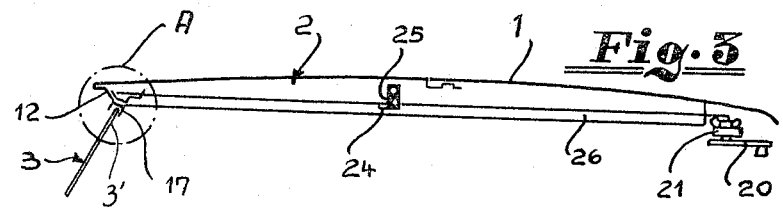
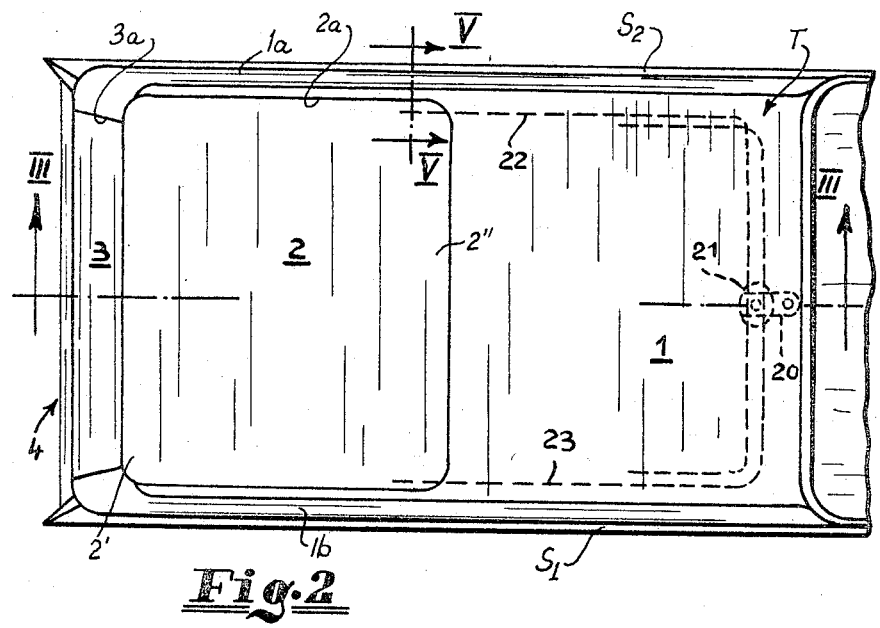
INVENTOR:
HANS GOLDE
BY Michael S. Striker
his ATTORNEY Aug. 1, 1967  H. GOLDE  3,333,889
AUTOMOTIVE VEHICLE
Filed March 16, 1965  3 Sheets-Sheet 2

INVENTOR:
HANS GOLDE
BY
Michael J. Striker
his ATTORNEY

Aug. 1, 1967          H. GOLDE          3,333,889
AUTOMOTIVE VEHICLE
Filed March 16, 1965          3 Sheets-Sheet 3
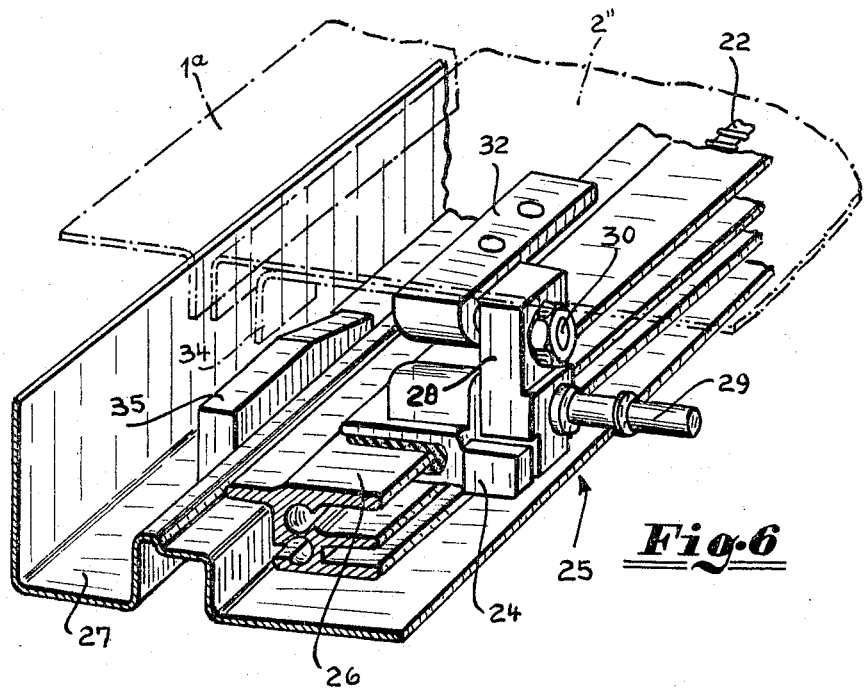
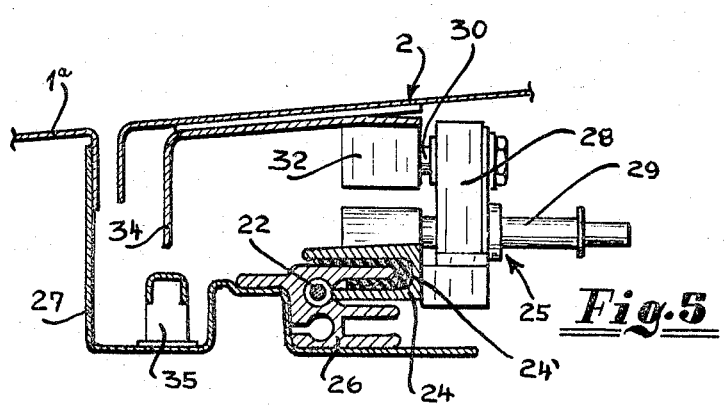
INVENTOR:
HANS GOLDE
BY
Michael J. Striker
his ATTORNEY

United States Patent Office 3,333,889
Patented Aug. 1, 1967

3,333,889
AUTOMOTIVE VEHICLE
Hans Golde, Hanauer Landstrasse 338,
Frankfurt am Main, Germany
Filed Mar. 16, 1965, Ser. No. 440,168
Claims priority, application Germany, Mar. 16, 1964,
G 29,684
9 Claims. (Cl. 296—137)

The present invention relates to automotive vehicles in general, and more particularly to an improved body construction for delivery trucks, station wagons and similar automobiles of the type provided with a rear door and with a roof opening which is sealable by a rigid roof panel, also called sliding roof. Still more particularly, the invention relates to an improved sealing structure between the rigid roof panel and the rear door of a station wagon or the like.

Conventional station wagons of the type wherein the body defines a roof opening and a rear opening which merges into the roof opening, and wherein the roof opening is sealable by a rigid roof panel, normally comprise a rear door having a window pane which must be lowered in order to permit forward movement of the roof panel. This is due to the fact that the sealing structure between the rear door and the roof panel consists of a U-shaped sealing strip which straddles the upper edge portion of the window pane from three sides. Thus, whenever the driver wishes to expose the roof opening, he must crawl to the rear part of the compartment to lower the window pane so that its upper edge is withdrawn from the U-shaped sealing strip, whereupon the roof panel is lowered by a handle or the like and is pushed forwardly by hand to expose a part of or the entire roof opening. Alternatively, and if the roof opening is exposed, the driver must get out of the vehicle, walk to the rear end, open the rear door and lower the window pane before the roof panel can be returned to sealing position. It happens quite frequently that the vehicle is caught in a sudden rainfall or snowfall and, if the roof panel is in open position, the interior of the compartment will be exposed to rain or snow before the driver can complete all manual operations necessary to return the roof panel to its sealing position. Furthermore, the driver might wish to expose the roof opening while travelling on a highway or in city traffic, i.e., under circumstances when it is practically impossible to keep the vehicle standing or to leave the vehicle even for short periods of time.

Accordingly, it is an important object of the present invention to provide an automotive vehicle whose body is provided with merging roof and rear openings and to construct and assemble the seal between the rigid roof panel and the rear door in such a way that either of these parts may be moved to and from sealing position while the other part remains in sealing position.

Another object of the invention is to provide a novel sealing structure between the rear edge portion of a rigid roof panel and the upper edge portion of a rear door, and to construct the sealing structure in such a way that the roof panel may be moved to and from its open position regardless of the momentary position of the rear door.

A further object of the invention is to provide a sealing structure of the just outlined characteristics which will allow the roof panel to move into or from sealing position even if the rear door is formed with a window pane which is movable up and down, and regardless of whether the rear door is swingable about a vertical or horizontal axis.

An additional object of the invention is to provide a novel actuating mechanism for the roof panel and to construct the actuating mechanism in such a way that the roof panel is rapidly shiftable into and from sealing position and that such operation can be performed by the person occupying the driver's seat.

A concomitant object of the invention is to provide an improved body construction for delivery trucks, station wagons and similar automotive vehicles which embodies a sealing structure of the above outlined characteristics.

An additional object of the invention is to provide a body construction for station wagons or the like wherein the roof panel may be fully concealed beneath a rigid portion of the top wall and wherein such movement of the roof panel may be effected by remote control, either manually or by a power-driven mechanism.

Briefly stated, one feature of my invention resides in the provision of an automotive vehicle whose body comprises two spaced side walls having rear portions which define between themselves a rear opening, and a top wall extending between and at a level above the side walls and defining a roof opening which merges into the rear opening. The top wall comprises a fixed portion which is located in front of the roof opening, and this top wall supports a rigid roof panel which is shiftable between a sealing position in the roof opening and an open position beneath the fixed portion of the top wall. A door panel is hingedly secured to the body and is swingable between a sealing position in the rear opening and an open position. The two panels comprise transversely extending edge portions and such edge portions are located between the two openings in the sealing positions of the respective panels. In accordance with my invention, the vehicle further comprises sealing means including an elongated strip of elastic material carried by one of the panels and defining a channel sealingly receiving the edge portion of the other panel. The channel has an open side through which the edge portion of the other panel is free to pass when the other panel moves to and from its sealing position while the one panel remains in sealing position.

For example, and if the elastic strip is carried by the rear edge portion of the roof panel, the open side of the channel faces rearwardly or partly rearwardly so that the hinged door panel may be opened or closed while the roof panel remains in sealing position, and the roof panel may be moved to and from sealing position while the door panel remains in sealing position.

In accordance with another feature of my invention, the roof panel is shiftable by remote control, preferably by an actuating mechanism which may be manipulated or controlled by the driver from his seat, so that the roof panel may expose or seal the roof opening while the rear door remains in fully or partly closed position.

The novel features which are considered as characteristic of the invention are set forth in particular in the appended claims. The improved vehicle itself, however, both as to its construction and the mode of manipulating the same, together with additional features and advantages thereof, will be best understood upon perusal of the following detailed description of certain specific embodiments with reference to the accompanying drawings, in which:

FIG. 1 is a fragmentary side elevational view of the upper part of a station wagon or delivery truck which embodies one form of my invention;

FIG. 2 is a top plan view of the structure shown in FIG. 1;

FIG. 3 is a schematic longitudinal vertical section as seen in the direction of arrows from the line III—III of FIG. 2;

FIG. 5 is an enlarged fragmentary transverse section as seen in the direction of arrows from the line V—V of FIG. 2;

FIG. 6 is a perspective view of the structure shown in FIG. 5; and

Figure 4:
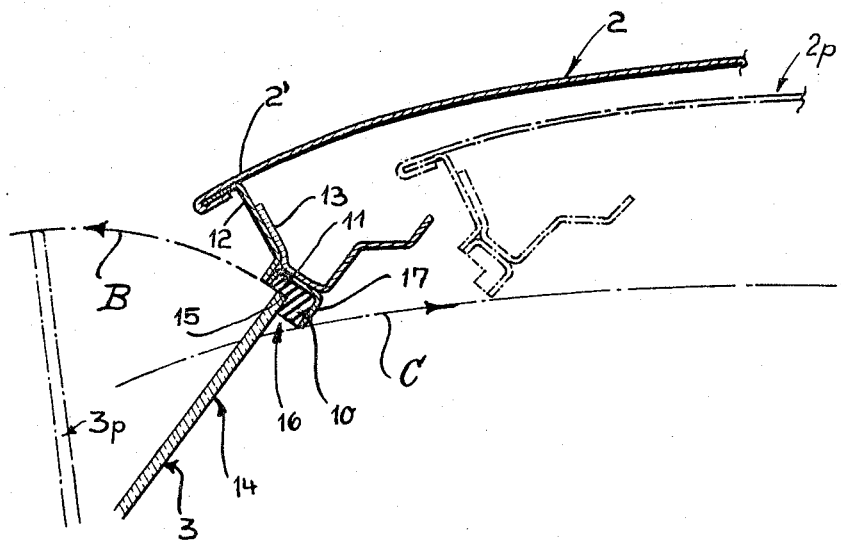
FIG. 4 is an enlarged fragmentary sectional view of a detail within the phantom-line circle A in FIG. 3.

Referring to the drawings, and first to FIGS. 1 to 3, there is shown a station wagon or delivery truck including a body which comprises two spaced side walls S1, S2 whose rear portions define between themselves a rear opening 3a, and a top wall T defining a roof opening 2a which merges into the rear opening 3a. The top wall T further comprises a fixed portion 1 which is rigid and is located in front of the roof opening 2a. The rear opening 3a is sealable by a panel 4 constituting a rear door which is hinged at its lower end so that it may swing its window pane 3 about a horizontal axis from the solid-line sealing position to and beyond the phantom-line open position 3p shown in FIG. 4. The roof opening 2a is sealable by a rigid roof panel 2 which is shiftable from the solid-line sealing position to and beyond the phantom-line open position 2p shown in FIG. 4. When the roof panel 2 is moved to its open position, at least a part thereof is located at a level below the fixed portion 1 of the top wall T. In other words, the front edge portion 2″ of the roof panel 2 must descend prior to movement of this roof panel to and beyond the phantom-line position 2p. The length of the fixed portion 1 is preferably such that it can overlie the entire roof panel 2 when the roof opening 2a is fully exposed.

The window pane 3 is movable up and down by means of a conventional mechanism which is accommodated in the lower part of the door panel 4 and whose crank arm is accessible from the compartment of the station wagon. Insofar as my present invention is concerned, the window pane 3 may be replaced by a metallic part of the door panel 4, and the door panel may be mounted to swing about a substantially vertical axis, i.e., about an axis which extends along the rear edge portion of the side wall S1 or S2. Also, the door panel 4 may be a double door having two panels each of which is hinged to one of the side walls. Still further, the window pane 3 may be surrounded by a rigid frame so that the upper edge portion of the door panel 4 will consist of metallic material.

Referring now to FIG. 4, it will be seen that the upper edge portion 3′ of the window pane 3 constitutes the upper edge portion of the door panel 4. When the window pane 3 is moved to its upper end position and the door panel 4 is held in the solid-line position of FIG. 4, the upper edge portion 3′ extends transversely between the openings 2a, 3a and is adjacent to the rear edge portion 2′ of the roof panel 2 provided, of course, that the panel 2 seals the roof opening 2a. In accordance with my invention, the sealing structure between the panels 2 and 4 comprises a rather thick transversely extending sealing strip 16 which consists of rubber or other suitable elastomeric material. The strip 16 is of V-shaped cross-sectional outline and defines a channel whose open side faces rearwardly and downwardly. This channel receives the upper edge portion 3′ of the window pane 3 in such a way that the top face 15 of the edge portion 3′ abuts against the underside of a leg 11 and that the inner side face 14 of the edge portion 3′ abuts against a leg 10. The legs 10, 11 constitute the V-shaped strip 16. The inclination of the legs 10, 11 is selected in such a way that the underside of the leg 11 is substantially tangential to an arc B which denotes the path of the top face 15. In other words, and when the window pane 3 is to be swung into the phantom-line position 3p its top face 15 slides along the underside of the leg 11 while the inner side face 14 moves away from the outer side of the leg 10. The legs 10, 11 will normally undergo some deformation when the window pane 3 is swung back to the solid-line position of FIG. 4.

The strip 16 is accommodated in a rigid U-shaped liner or back support 17 which surrounds the inner side of the leg 10, the upper side of the leg 11, and the outer side of the leg 11. The outer flange of the liner 17 is rigid with the lower flange of a U-shaped carrier 12 whose upper flange is connected to the rear edge portion 2′ of the roof panel 2. It will be seen that the rear edge portion 2′ is bent over itself so that it overlies both sides of the upper flange on the carrier 12. The sealing structure is reinforced by a profiled stiffener member 13 which is rigid with the bases of the carrier 12 and lines 17 and which may extend forwardly toward the fixed portion 1 of the top wall T. The arc C denotes the path of the lowermost part of the liner 17 when the roof panel 2 is shifted from the solid-line sealing position toward and beyond the phantom-line open position 2p of FIG. 4.

It will be seen that the rear edge portion 2′ forms an eave which overlies and is located at a level above the lower flange of the carrier 12, and that the lower flange of this carrier forms an eave which overlies and is located at a level above the top face 15 of the edge portion 3′. This insures that moisture or dust is not likely to penetrate into the gap between the top face 15 and the leg 11 in the event that the top face 15 happens to be slightly below the underside of the leg 11. The main sealing action is provided by the inner side face 14 which bears against the leg 10 and deforms this leg against the inner flange of the liner 17. It is clear that the carrier 12 forms a fluidtight seal between the rear edge portion 2″ and the liner 17.

The parts 12, 13 and 17 may consist of metallic or synthetic plastic material and may be welded, glued or otherwise securely fastened to each other. It will be noted that the liner 17 cannot interfere with movements of the window pane 3 in and counter to the directions indicated by the arrow B, regardless of whether the window pane is in fully or partly raised position. Also, the liner 17 cannot interfere with movements of the roof panel 2 in and counter to the directions indicated by the arrow C. This is due to the fact that the sealing strip 16 straddles only two faces of the upper edge portion 3′ and that the open side of the channel defined by the strip 16 faces rearwardly and downwardly so that the window pane 3 may move up or down and that the door panel 4 may swing to and from its sealing position.

FIGS. 2, 3, 5 and 6 illustrate a remote control actuating mechanism which is utilized to move the roof panel 2 to and from its sealing position. This remote control mechanism includes a manually operable crank arm 20 which is mounted at the underside of the rigid portion 1 of the top wall T so as to be within reach of the person occupying the driver's seat. The crank arm 20 is preferably located midway between the side walls S1, S2 so that it can be rotated by the driver or by the person sitting next to the driver. This crank arm operates a suitable transmission 21 which serves to move two motion transmitting cables 22, 23 each of which is capable of taking up compressive and tensional stresses. The rear ends of the cables are connected with two hinge units 25 one of which is illustrated in FIGS. 5 and 6. The purpose of such hinge units is to lower the front edge portion 2″ of the roof panel 2 and to advance the roof panel to open position in which the roof panel is located below the fixed portion 1 when the crank arm 20 is rotated in one direction. When the roof panel 2 is in open position and the crank arm 20 is rotated in the opposite direction, the panel 2 will move toward sealing position and, once the elastic strip 16 engages the faces 14, 15 of the window pane 3, the front edge portion 2″ is raised to the level shown in FIG. 2 so that the roof opening 2a is completely sealed.

FIGS. 5 and 6 show one of the two rearwardly projecting extensions or ledges 1a, 1b which are adjacent to the sides of the roof opening 2a and are integral with the fixed portion 1. The ledge 1a carries a profiled support 27 for an elongated rail 26 which guides a slider or shoe 24. The interior of the shoe 24 is lined with a layer of wear-resistant material 24' and the lower leg of this shoe is coupled to the rear end of the cable 22. The shoe 24 is rigid with a transversely extending horizontal shaft 29 which supports a rockable hinge member 28. The hinge member 28 carries a second shaft 30 which is parallel with the shaft 29 and carries a connecting bracket 32 which is rigid with the underside of the roof panel 2 and is adjacent to the ledge 1a. If the transmission 21 exerts a pull on the cable 22, the hinge member 28 will be rocked in a clockwise direction, as viewed in FIG. 6, and moves the bracket 32 to a lower level so that the front edge portion 2" of the roof panel 2 is then located at a level below the rear edge of the fixed portion 1. The roof panel 2 is now ready to advance into the space beneath the fixed portion 1 if the operator continues to rotate the crank arm 20 in a sense to pull the cable 22 forwardly. If the crank arm 20 is rotated in the opposite direction, the cable 22 is subjected to compressive stresses and pushes the shoe 24 rearwardly. In the final stage of such rearward movement of the cable 22, the hinge member 28 is rocked in a counterclockwise direction (as viewed in FIG. 6) and raises the bracket 32 so that the front edge portion 2" of the roof panel 2 rises to the level of the fixed portion 1. In order to facilitate return movement of the front edge portion 2" into its sealing position, the hinge unit 25 preferably comprises a cam 35 which is fixed to the support 27 and cooperates with a follower 34 which is mounted at the underside of the roof panel 2. When the roof panel 2 approaches its rear end position, the follower 34 begins to slide along the suitably inclined top face of the cam 35 and assists the cable 22 in rocking the hinge member 28 in a counterclockwise direction, as viewed in FIG. 6.

It is clear that the crank arm 20 may be replaced by a small electric motor and/or that the transmission 21 may be connected with a power take-off driven by the engine of the automotive vehicle. Also, the cables 22, 23 may be replaced by sets of belts, wires or chains trained around suitable pulleys or sprocket wheels. All that counts is to provide a suitable actuating mechanism which enables the driver to move the roof panel by remote control. Such movements by remote control are made possible by the provision of the improved sealing structure which allows the roof panel 2 to move to and from its sealing position while the door panel 4 remains in sealing position, or vice versa.

Figure 7:
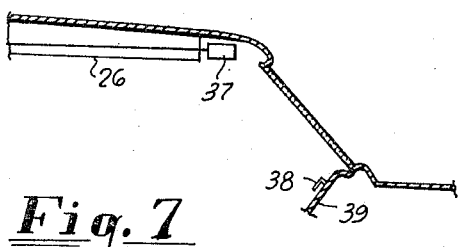
FIG. 7 is a fragmentary diagrammatic longitudinal vertical section through a modified vehicle.

In FIG. 7, the crank arm 20 is replaced by a reversible electric motor 37 which need not be installed next to the driver's seat as long as the switch 38 or switches which control the operation of the motor 37 are sufficiently close to the driver so as to be within reach on the control panel 39 or elsewhere in the region of the driver's seat. For example, the motor 37 may be mounted under the hood of the vehicle or directly above the windshield and in front of the rails 26 (as shown in FIG. 7).

When the two panels are moved to open positions, the openings 2a, 3a form a composite opening which extends from the lower rear end of the body and all the way to the median part of the top wall T. Such opening is of advantage if the vehicle is used for transportation of bulky goods which must extend beyond the top wall and/or beyond the rear opening 3a when the vehicle is in motion. In heretofore known vehicles, composite openings were formed only in vehicles with foldable roofs. Reference may be had in this connection to my copending application Ser. No. 344,424 which discloses an automotive vehicle with a foldable roof for transportation of bulky and/or oddly configurated goods.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims:

What is claimed as new and desired to be secured by Letters Patent is:

1. In an automobile, a body having a longitudinal axis and comprising two side walls having rear portions defining between themselves a rear opening, and a top wall extending between and at a level above said side walls and defining a roof opening merging into said rear opening, said top wall including a fixed portion located in front of said roof opening; a rigid roof panel having a transversely extending first edge portion and being movable in axial direction of said body between a sealing position in said roof opening and an open position beneath said fixed portion; a door panel hingedly secured to said body and swingably movable transversely of the elongation of said first edge portion between a sealing position in said rear opening and an open position, each of said panels having an elongated transversely extending edge portion and said edge portions being located between said openings in the sealing positions of said panels; and sealing means comprising an elongated strip of elastic material carried by one of said panels extending along the edge portion thereof transversely of said longitudinal axis and defining a channel sealingly receiving the edge portion of the other panel, said channel having a closed side and an open side which at least in the sealing position of said one panel face in opposite axial directions of said body, the edge portion of said other panel being free to pass through said open side of said channel when the other panel moves to and from its sealing position while said one panel remains in sealing position.

2. In an automobile, a body having a longitudinal axis and comprising two side walls having rear portions defining between themselves a rear opening, and a top wall extending between and at a level above said side walls and defining a roof opening merging into said rear opening, said top wall including a fixed portion located in front of said roof opening; a rigid roof panel having a transversely extending first edge portion and being movable in axial direction of said body between a sealing position in said roof opening and an open position beneath said fixed portion; a door panel hingedly secured to said body and swingably movable transversely of the elongation of said first edge portion between a sealing position in said rear opening and an open position, each of said panels having an elongated transversely extending edge portion and said edge portions being located between said openings in the sealing positions of said panels; sealing means comprising an elongated strip of elastic material carried by one of said panels extending along the edge portion thereof transversely of said longitudinal axis and defining a channel sealingly receiving the edge portion of the other panel, said channel having a closed side and an open side which at least in the sealing position of said one panel face in opposite axial directions of said body, the edge portion of said other panel being free to pass through said open side of said channel when the other panel moves to and from its sealing position while said one panel remains in sealing position; and remote-control actuating means provided within reach of the person occupying the driver's seat of the automobile for moving the roof panel between said open and sealing positions.

3. In an automobile, a body having a longitudinal axis and comprising two side walls having rear portions defining between themselves a rear opening, and a top wall extending between and at a level above said side walls and defining a roof opening merging into said rear opening, said top wall including a fixed portion located in front of said roof opening; a rigid roof panel having a transversely extending first edge portion and being movable in axial direction of said body between a sealing position in said roof opening and an open position beneath said fixed portion; a door panel hingedly secured to said body and swingably movable transversely of the elongation of said first edge portion between a sealing position in said rear opening and an open position, each of said panels having an elongated transversely extending edge portion and said edge portions being located between said openings in the sealing positions of said panels, the edge portion of said door panel having a top face and an inner side face; and sealing means comprising an elongated strip of elastic material carried by said roof panel extending along the edge portion thereof transversely of said longitudinal axis, said strip comprising two legs one of which abuts against said top face and the other of which abuts against said inner side face when the panels are moved to sealing positions, said legs defining between themselves an elongated channel having a closed side and an open side facing in opposite axial directions of said body, said edge portion of said door panel being free to move through said open side to and from sealing position while said roof panel remains in sealing position whereby said top face slides along said one leg and said inner side face moves into abutment with or away from said other leg, said one leg being compelled to slide along said top face when the roof panel is moved from sealing position while said door panel remains in sealing position.

4. In an automotive vehicle, a body having a longitudinal axis and comprising two side walls having rear portions defining between themselves a rear opening, a top wall extending between and at a level above said side walls and defining a roof opening merging into said rear opening, said top wall including a fixed portion located in front of said roof opening; a rigid roof panel having a transversely extending first edge portion and being movable in axial direction of said body between a sealing position in said roof opening and an open position beneath said fixed portion; a door panel hingedly secured to said body and swingably movable transversely of the elongation of said first edge portion between a sealing position in said rear opening and an open position, said roof panel having an elongated transversely extending rear edge portion and said door panel having an elongated transversely extending upper edge portion, said edge portions being adjacent to each other in sealing positions of said panels and said upper edge portion having a top face and an inner side face; and sealing means comprising an elastically deformable strip extending along said edge portions transversely of said longitudinal axis and having two legs each of which abuts against one of said faces in sealing position of said panels, said strip defining an elongated channel for said upper edge portion and said channel having a closed side and an open side which at least in said sealing position of said panels face in opposite axial directions of said body, through which open side said upper edge portion is free to pass in response to movement of said door panel to and from sealing position while said roof panel remains in sealing position, said sealing means further comprising a rigid liner carried by said rear edge portion and constituting a back support for said strip.

5. A structure as set forth in claim 4, further comprising a rigid carrier connected with said liner and secured to the rear edge of said roof panel and stiffener means connected with said carrier and with said liner.

6. A structures as set forth in claim 5, wherein said rear edge portion overlies and forms an eave above said liner.

7. A structure as set forth in claim 5, wherein said carrier overlies and forms an eave above said strip.

8. In an automotive vehicle, a body having a longitudinal axis and comprising two side walls having rear portions defining between themselves a rear opening, and a top wall extending between and at a level above said side walls and defining a roof opening merging into said rear opening, said top wall having a fixed portion located in front of said roof opening; a rigid roof panel having a transversely extending first edge portion and being movable in axial direction of said body between a sealing position in said roof opening and an open position beneath said fixed portion, said panel having transversely extending elongated front and rear edge portions and said front edge portion being movable into the plane of and to a level below said roof opening; a door panel hingedly secured to said body and swingably movable transversely of the elongation of said first edge portion between a sealing position in said rear opening and an open position, said door panel having an elongated transversely extending upper edge portion which is adjacent to said rear edge portion in the sealing positions of said panels; sealing means comprising an elongated strip of elastic material carried by and extending along said rear edge portion transversely of said longitudinal axis and defining a channel sealingly receiving said upper edge portion in the sealing positions of said panels, said channel having a closed side and an open side facing in opposite axial directions of said body, said edge portion of said door panel being free to move through said open side when the door panel moves to and from its sealing position while the roof panel remains in sealing position; and actuating means for moving the roof panel between said sealing and open positions, said actuating means comprising an actuating member mounted within reach of the driver and an operative connection between said actuating member and said roof panel, said actuating means being arranged to lower said front edge portion prior to movement of said roof panel beneath said fixed portion and to raise said front edge portion subsequent to return movement of said roof panel.

9. A structure as set forth in claim 8, wherein said actuating means further comprises motor means operatively connected with said actuating member and said roof panel, and wherein said actuating member is a switch means connected in circuit with said motor means, said switch means being within reach of the person occupying the driver's seat so that the occupant of the driver's seat may initiate movements of said roof panel to and from said sealing position.

References Cited
UNITED STATES PATENTS

| | | | |
|---|---|---|---|
| 2,957,725 | 10/1960 | Ford et al. | 49—36 |
| 2,968,514 | 1/1961 | Golde. | |
| 2,992,039 | 7/1961 | Bretzner | 49—36 X |
| 3,052,496 | 9/1962 | Frey | 49—36 |

FOREIGN PATENTS

| | | |
|---|---|---|
| 1,238,438 | 7/1960 | France. |

LEO FRIAGLIA, *Primary Examiner.*

BENJAMIN HERSH, *Examiner.*

C. C. PARSONS, *Assistant Examiner.*